W. H. SKINNER.
AUTO ATTACHMENT.
APPLICATION FILED NOV. 28, 1914.

1,158,735.

Patented Nov. 2, 1915.
2 SHEETS—SHEET 1.

Inventor
William H. Skinner.

Witnesses

By Richard B. Owen.
Attorney

W. H. SKINNER.
AUTO ATTACHMENT.
APPLICATION FILED NOV. 28, 1914.

1,158,735.

Patented Nov. 2, 1915.
2 SHEETS—SHEET 2.

Witnesses
Guy M. Sprung.
Carroll Bailey.

Inventor
William H. Skinner
By Richard B. Owen.
Attorney

UNITED STATES PATENT OFFICE.

WILLIAM H. SKINNER, OF FORISTELL, MISSOURI.

AUTO ATTACHMENT.

1,158,735.   Specification of Letters Patent.   Patented Nov. 2, 1915.

Application filed November 28, 1914. Serial No. 874,464.

*To all whom it may concern:*

Be it known that I, WILLIAM H. SKINNER, a citizen of the United States, residing at Foristell, in the county of St. Charles and State of Missouri, have invented certain new and useful Improvements in Auto Attachments, of which the following is a specification.

This invention relates to attachments for traction wheels, and has for its primary object to provide a simple attachment of this character which will prevent slipping or skidding of vehicle wheels on soft soil or slippery streets.

The invention resides in the provision of a number of blades for engagement with the ground, adapted to be moved into and out of an operative position, and it is a further object of the invention to so construct the attachment that the blades will automatically adjust themselves to hard or soft soil.

With these and other objects in view, the invention consists in the novel features of construction, combination and arrangement of parts as will be hereinafter more fully described, illustrated in the accompanying drawings and claimed.

Figure 1:
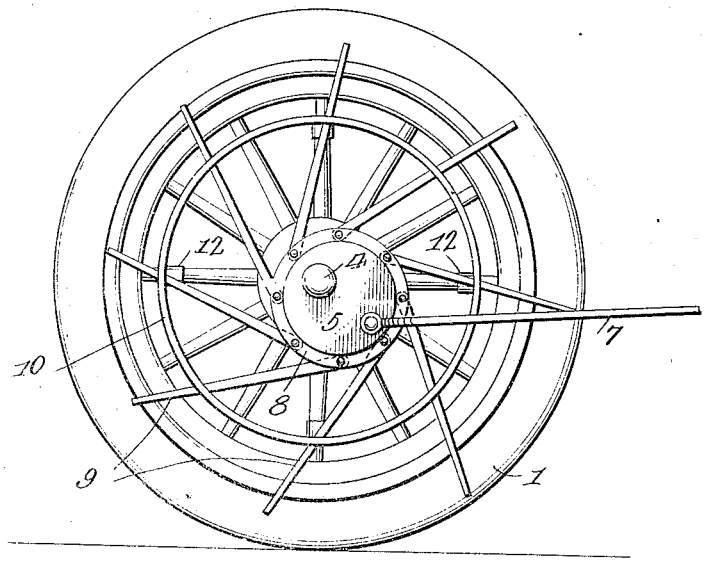
Figure 2:
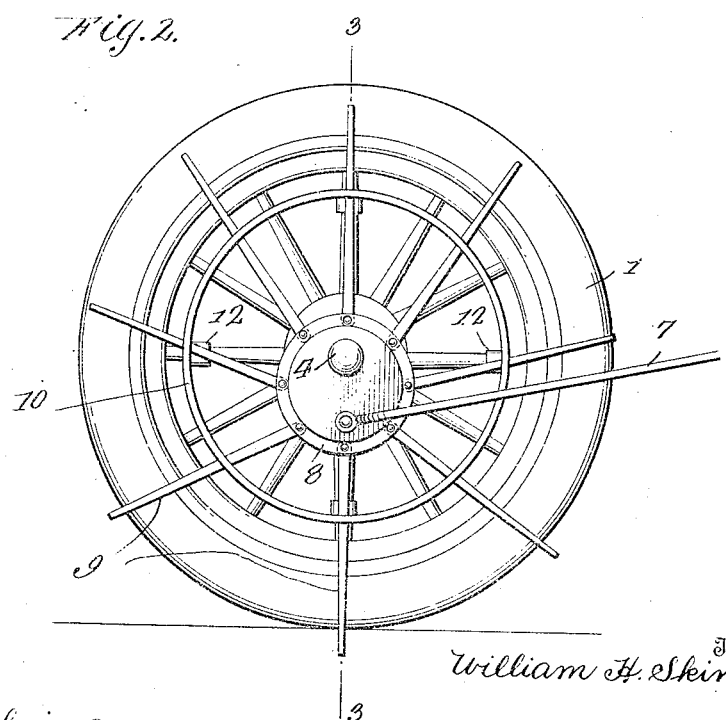
Figure 3:
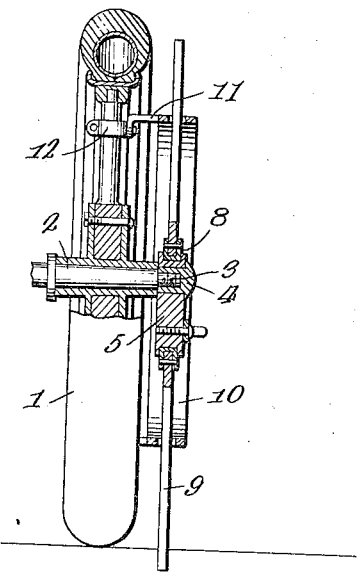
Figure 6:
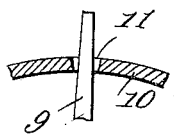
Figure 4:
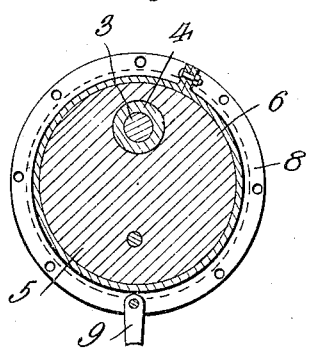
Figure 5:
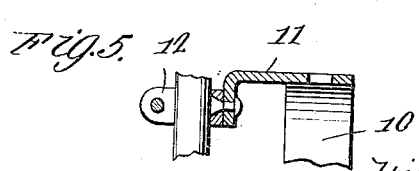

In the drawings: Figure 1 is a side elevation of a wheel showing the attachment applied thereto; Fig. 2 is a similar view showing the blades in a different position; Fig. 3 is a transverse section on the line 3—3 of Fig. 2; Fig. 4 is an enlarged vertical section of the cam member; Fig. 5 is a detail view showing the manner of attaching the drum to the wheel; Fig. 6 is a detail sectional view of a portion of the drum.

Referring to the drawings by numerals, 1 designates a vehicle wheel which may be of any ordinary construction and which is adapted to rotate on the usual axle spindle 2. In applying the attachment to an automobile wheel, the ordinary dust cap is first removed from the reduced threaded extension 3 of the spindle and a cap 4 substituted therefor. A cam 5 is mounted on the cap 4 and is provided with an annular groove 6, a rod 7 being pivoted to the cam 5 and extended, to a position adjacent the driver's seat in order that the cam may be readily moved upon its pivoted connection with the cap 4.

Mounted in the groove 6 of the cam 5 is a band 8. This band is U-shaped and is adapted to receive, between the upstanding portions thereof, the inner ends of blades 9, the blades being pivotally connected between the walls of the band as is clearly shown in the drawings. A drum 10 has spaced openings 11 formed therein and this drum is adapted to be rigidly connected with the vehicle wheel, the said drum being connected to the wheel by means of L-shaped extensions 11 which are connected to clips 12, the clips being adapted to be clamped upon the spokes of the wheel.

In operation, when it is desired to move the blades to an operative position, the rod 7 is operated to move the cam 5 from a position as shown in Fig. 1 of the drawings to a position as shown in Fig. 2 of the drawings. In this position it will be obvious that turning movement of the wheel will consequently cause a turning of the drum 10, and since the blades 9 are passed through openings in the said drum these will be caused to turn also. By referring to Fig. 6 of the drawings it will be seen that the openings in the drum through which the blades pass are but slightly larger than the blades. By reference to Fig. 2 of the drawings it will be seen that if the surface over which the wheel is traveling be hard, the action of the blades will be to strike the ground and cause a slight backward turning movement of the band 8 independently of the drum 5 and consequently cause the blades to be retracted; but, if the ground over which the wheel is passing be soft, the resistance against the ends of the blades will be insufficient to cause movement of the inner ends of the blades and the same will engage the soil to the full extent of the distance they project beyond the periphery of the wheel.

From the foregoing description taken in connection with the accompanying drawings it is thought that the construction and operation of the device will be clearly understood and while I have herein shown and described one specific form of my invention I do not wish to be limited thereto, except for such limitations as the claims may import.

What is claimed is:—

1. In combination with a vehicle wheel, an axle therefor, said axle being provided with a reduced threaded extension, a drum carried by said wheel, a cap mounted on said reduced extension of said axle, an eccentric mounted on said cap, a band mounted on said eccentric, blades connected to said band and passing through said drum, and means to move said eccentric to move the blades relative to said drum.

2. In combination with a vehicle wheel, an axle therefor, said axle being provided with a reduced threaded extension, a cap on said extension, a drum, said drum provided with spaced apart openings, an eccentric mounted on said cap, said eccentric provided with an annular groove, a split band engaging said groove, radial blades pivotally connected to said band and passing through said openings in said drum, said blades tapering toward their free ends, extensions formed on said drum, clips detachably connected to the spokes of the wheels, said extensions being rigidly connected with said clips to space said drum from said wheel, and means to move said eccentric to move the blades relative to said drum as and for the purpose set forth and described.

In testimony whereof I affix my signature in presence of two witnesses.

WILLIAM H. SKINNER.

Witnesses:
  Wm. W. Skinner,
  Geo. W. Riemeier.